United States Patent [19]

Windish

[11] 4,020,932

[45] May 3, 1977

[54] GEARED STEER TRANSMISSION

[75] Inventor: Willis E. Windish, Pekin, Ill.

[73] Assignee: Caterpillar Tractor Co., Peoria, Ill.

[22] Filed: Jan. 19, 1976

[21] Appl. No.: 650,573

Related U.S. Application Data

[63] Continuation of Ser. No. 515,158, Oct. 16, 1974, abandoned.

[52] U.S. Cl. .............................. 192/4 A; 188/170; 74/720.5

[51] Int. Cl.² .................. B60K 41/26; F16D 65/24; F16H 37/06

[58] Field of Search ............... 74/720.5, 764, 765; 192/4 A, 4 R, 7, 8 R; 188/170

[56] References Cited

UNITED STATES PATENTS

| | | | |
|---|---|---|---|
| 2,272,934 | 2/1942 | Cotal | 74/720.5 |
| 2,318,798 | 5/1943 | Piron | 188/170 X |
| 2,330,739 | 9/1943 | Piron | 188/170 |
| 3,095,067 | 6/1963 | Murty et al. | 188/170 |
| 3,132,724 | 5/1964 | Ansteth | 188/170 X |
| 3,137,182 | 6/1964 | Berchtold et al. | 74/720.5 |
| 3,536,230 | 10/1970 | Williams | 188/170X |
| 3,599,761 | 8/1971 | Schultz et al. | 188/170 |

Primary Examiner—Samuel Scott
Assistant Examiner—Lance W. Chandler
Attorney, Agent, or Firm—Phillips, Moore, Weissenberger, Lempio & Majestic

[57] ABSTRACT

A transmission having geared steer with six forward and six reverse speeds is provided. Alternate power turn radii steering options are also provided for high and low speed operation. Hydraulic disengagement of the transmission brake is accomplished by injecting lubricant fluid from an external source, so as to permit assembly or towing. An improved arrangement of power train components facilitates their assembly and disassembly.

7 Claims, 2 Drawing Figures

GEARED STEER TRANSMISSION

This is a continuation, of Ser. No. 515,158, filed Oct. 16, 1974 now abandon.

BACKGROUND OF THE INVENTION

This invention is directed to an improved transmission having geared steer which avoids the necessity of brake steering. More particularly, this invention is directed to a cross drive planetary transmission for a track-type vehicle which provides a plurality of forward and reverse speeds with alternate power turn radii steering options. Still further, this invention includes a provision for hydraulic disengagement of the transmission brake.

In track-type vehicles as used in the earthmoving industry, transmissions having brakes are frequently employed. Steering is accomplished by application of the brakes with attendant disadvantages. With band-type vehicles, for example, the brakes have limited capacity for a given drum size and require cooling systems and self-adjusting actuating linkages. Because of these and other problems larger vehicles have gone over to disc-type power shift brakes. However, this has not completely eliminated the aforementioned problems.

Another problem is the requirement that the track-type vehicle be capable of performing a variety of dissimilar tasks. For instance, such a vehicle may be called upon to haul heavy loads at relatively high speeds as in the construction industry. At the same time the vehicle must be capable of adapting to operation as a low speed high torque vehicle in a variety of applications such as when in drawbar applications.

Another problem relates to construction of the transmission in relation to the vehicle. To facilitate assembly, servicing and maintenance, it is desirable to construct the transmission arrangement so that it may be easily assembled and removed, preferably as major units or modules.

Still another problem is a result of the transmission brake being normally engaged and hydraulically disengaged. In the absence of vehicle hydraulic pressure, as during vehicle breakdown, the transmission is undesirably engaged, which is detrimental to towing of the vehicle.

SUMMARY AND OBJECTS OF THE INVENTION

The invention relates to a power train for a track-type vehicle which includes a torque converter, and a transmission including a forward reverse unit, a high/low speed unit, a transfer gear unit, and a bevel gear connected to a planetary cross drive. The cross drive is, in turn, connected to a sprocket or final drive pinion.

The power train thus described is capable of providing a drive system for a track-type vehicle which is capable of performing a wide variety of tasks. Among these are the ability to haul heavy loads at relatively high speeds and to tow in low speed high torque applications. The invention thus described provides six speeds forward and a like number of speeds in reverse and includes alternate power turn radii steering options. The output from the bevel gear is transmitted to a cross shaft, which, in turn, provides input to each of the three speed planetary transmissions driving the vehicle tracks. Each planetary cross drive comprises three planetary gear units, the gear ratios of which are independently selectable by means of three stationary brakes. The speed range is capable of being changed by means of the high/low speed unit. The power turn radii and vehicle speed are controlled by selecting the appropriate number of gear teeth.

In order to enable disengagement of the normally engaged transmission brake in situations where there is no vehicle hydraulic power, a means is provided for introducing lubricant fluid to the brake piston so as to disengage the brake. The arrangement thus described also lends itself to "tubular" type vehicle frame construction. By this is meant that the various component units in the power train can be installed through apertures in different sides of the vehicle to produce an assembled unit within the vehicle frame. With the instant invention, the bevel gear unit is installed through an opening in the rear of the vehicle frame and the right and left cross drive units are installed through openings in the right and left sides of the frame, respectively. The modular construction thus described lends itself to quick assembly and disassembly for servicing or maintenance. It also allows for a shorter overall length between the engine and cross shaft as well as permits combining steering and transmission controls into a single hydraulic system.

It is therefore an object of this invention to provide an improved gear steer transmission.

It is a further object of this invention to provide a transmission which provides a plurality of turn radii by means of transmission cross drive, thereby eliminating steering brakes.

It is a still further object to provide a transmission with a plurality of turn radii with high and low speed ratio options.

It is a further object to provide a transmission the layout of which permits tubular type vehicle frame construction and which allows shorter overall length between the engine and cross shaft or output gear as well as allows he combining of steering and transmission controls into one hydraulic system.

It is yet another object to provide a transmission having a brake which may be hydraulically disengaged by injecting lubricant fluid from an external source, thus permitting assembly or towing.

DETAILED DESCRIPTION

Figure 1:
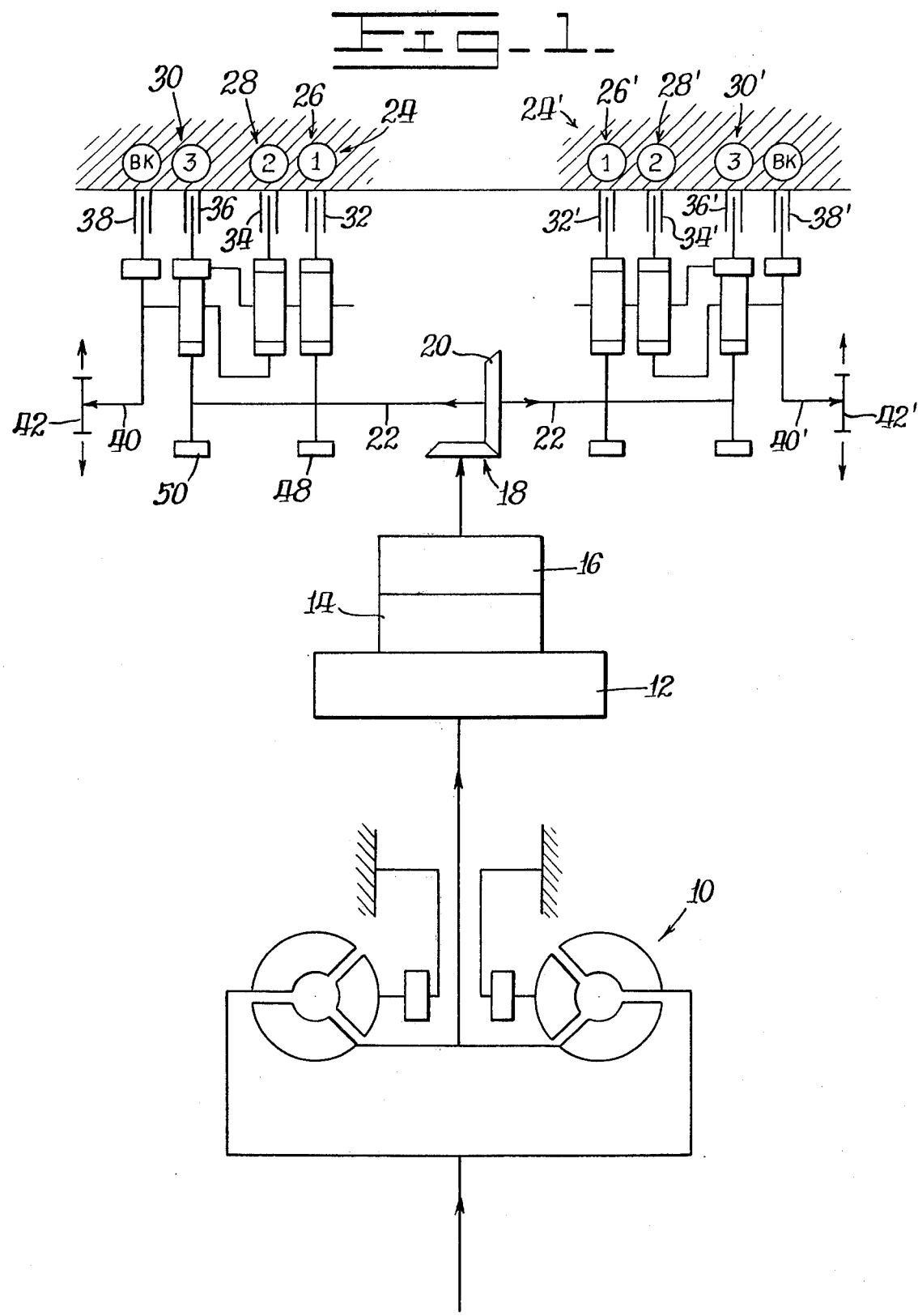
FIG. 1 is an overall schematic view of the geared steer transmission of the instant invention, illustrating the cross-drives, etc., in a power train; and, FIG. 2 is a cross-sectional side elevation view of a single cross drive planetary transmission illustrating details thereof.

Referring to FIG. 1 there is shown an overall schematic view of a power train incorporating the instant invention. The power train includes a torque converter shown generally at 10 which transmits power to a forward/reverse unit 12. The forward/reverse unit is, in turn, coupled to a high/low range 14 so as to provide the option of high and low output speeds. The power train further includes a transfer gear 16 which is connected to pinion and bevel gear arrangement shown generally at 18. From bevel gear 20, power is transferred to a cross drive shaft 22 which splits the power to right and left cross drives, 24, 24', respectively.

Cross drives 24, 24' include a first planetary set 26, 26', a second planetary set 28, 28', and a third planetary set 30, 30'. Each cross drive also comprises four stationary disc brakes 32, 32'; 34, 34'; 36, 36'; and 38, 38', respectively. The brakes are controlled by a conventional hydraulic control system (not shown). The output from cross drives 24, 24' is by way of right and left cross drive shafts 40, 40' which are, in turn, connected to right and left sprocket or final drive pinions, 42, 42', respectively.

Figure 2:
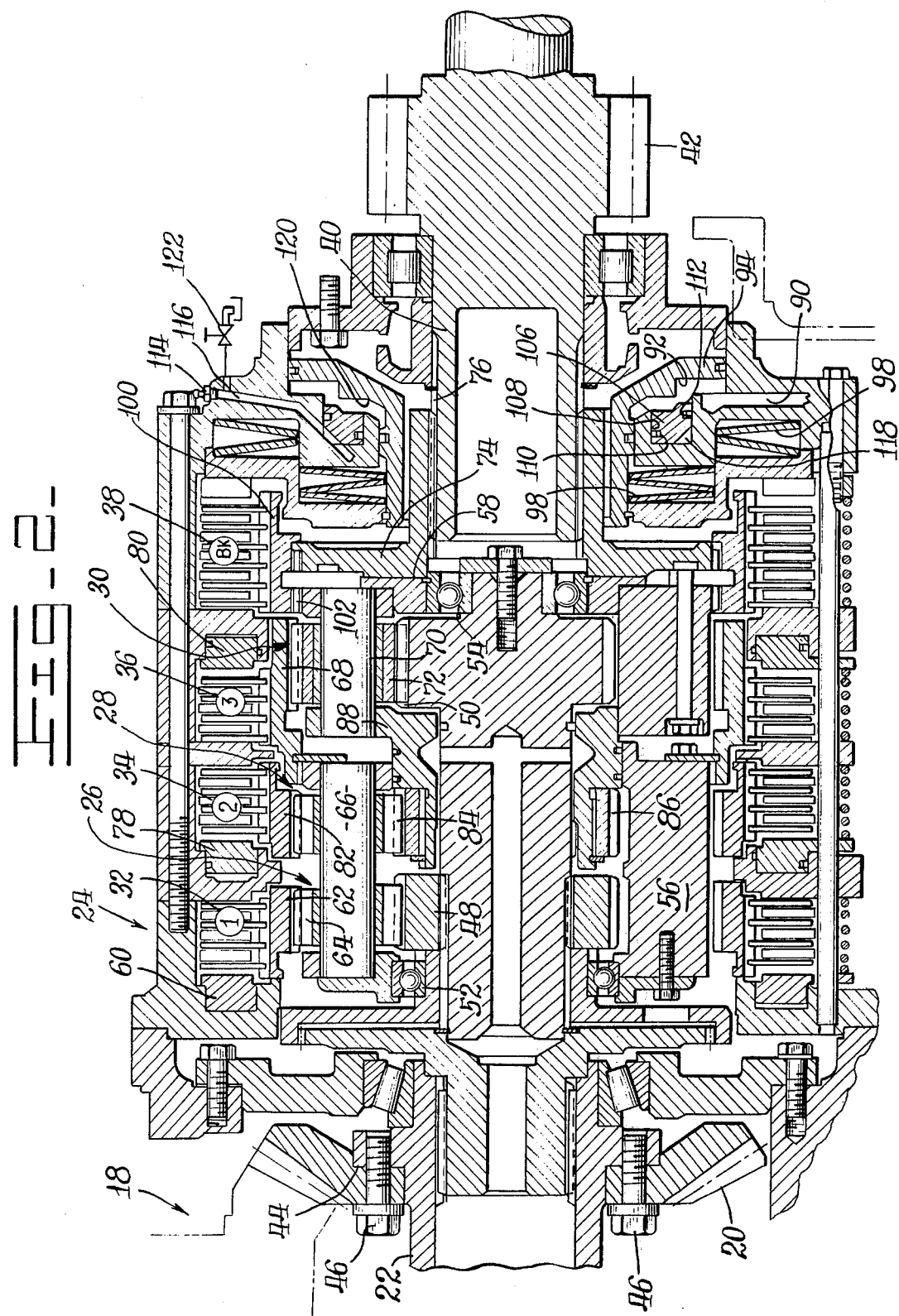

FIG. 2 shows a more detailed cross-sectional view of the right cross drive 24 which, since it is identical with the left cross drive, will serve to illustrate the structure and operation thereof. Power input from bevel gear 20 is transmitted to cross drive shaft 22 which is linked therewith by having a flanged portion 44 secured thereto by conventional means such as bolts 46 arranged around the periphery thereof. Ranged along shaft 22 in serial order are a pair of sun gears 48, 50, which form a part of first and third planetary sets 26 and 30, respectively. Suitable bearings 52, 54, are provided for rotative mounting of shaft 22 in bores in planet carriers 56, 58.

In high gear operation the high gear brake 32 is hydraulically locked by means of engaging a piston 60 to hold ring gear 62. In this manner sun gear 48 transmits power to a plurality of planet gears 64 supported on shaft 66. Since ring gear 62 is locked or grounded, rotation will be imparted to planet carrier 56.

Planet carrier 56 which supports planet gear shaft 65 is integral with ring gear 68 so that the shaft and ring gear rotate together. Thus, in high gear, the input sun gears 48 and 50 will rotate together in the same direction as ring gear 68. Intermediate ring gear 68 and sun gear 50 are a plurality of planets 72 supported on a gear shaft 70. Shaft 70, in turn, is integrally connected with an output flange 74 which is connected to cross drive shaft 40 by means of splines 76.

Since grounding of ring gear 62 is accomplished by means of piston 60, modulation of hydraulic pressure by the hydraulic control system (not shown) is used to allow slipping of the high speed brake 38 and thereby an infinitely variable turn radius in high speed operation. Similarly, for intermediate or low speed operation, brakes 34 and 36 are selectively engaged by pistons 78 and 80, respectively.

In particular, for intermediate speed operation, intermediate speed brake 34 is actuated by hydraulic pressure on engaging piston 78 so as to lock ring gear 82. Due to the fact that planet carrier 56 rotates, the plurality of planets 84 carried by it "walk" within ring gear 82 and thereby imparts drive through ring gear 68 providing a reaction for sun gear 50. Since sun gear 50 is the only input, the torque in carrier 88 is divided to both output flange 74 and to sun gear 86 providing torque to planet carrier 56. The sum of the torque of sun gear 86 and output flange 74 equals the torque in carrier 88. Also, the sum of the torque of ring gear 82 and sun gear 86 equals the torque on carrier 56 or ring gear 68. In similar manner to high speed operation described above, slipping of the intermediate speed brake by modulating hydraulic pressure on piston 78 provides an infinitely variable intermediate speed steering radius.

For low speed operation, the low speed brake 36 is actuated by means of hydraulic pressure engaging piston 80 so as to lock ring gear 68 and carrier 56. With ring gear 68 being held in this manner, the input from sun gear 50 causes planet gears 72 to "walk" around the internal tooth periphery of ring gear 68, thereby imparting drive through shaft 70 connected to output flange 74. As with the high and intermediate speed brakes, any slipping of the low speed brake will produce an infinitely variable steering radius at low speed.

Thus, power turns of various combinations may be provided by selective engagement of any of the above described high and low and intermediate speed brakes. The infinite power turn radii are accomplished by transmitting full power to either the right or left cross drive and engaging a specific transmission brake. The opposite transmission brake is then selectively engaged so as to slip and thereby provide different radius power turns.

Pivot turns can also be accomplished in addition to the power turns aforementioned. Pivot turns, as seen in FIG. 1, can be accomplished by brakes 38 or 38' which are normally engaged and serve as parking brakes. As seen in FIG. 2, in normal vehicle operation, hydraulic pressure is directed from a pressure source (not shown) through a passage 90 to an annular chamber 92. Pressure thus directed moves a piston 94 outwardly to release brake discs 38 against the force of Belleville springs 38. Releasng brake discs 96 permits a ring gear 100 attached to output flange 74 by means of splines 102, to rotate and transmit torque to output shaft 40.

Thus, when a pivot turn is to be accomplished, the hydraulic pressure in chamber 92 is released or vented and the force generated by springs 98 will move piston 94 to engage brake 38. In this manner, power going out of cross drive shaft 22 on the opposite side will produce a pivot turn.

As aforementioned, parking brakes 38, 38' are normally engaged. This desirably results in the brakes being normally applied whenever vehicle hydraulic pressure is lost as is the case during normal shutdown. However, when hydraulic pressure is lost during vehicle shutdown or otherwise it is not possible to tow or move the vehicle for repairs until the brakes are released.

To solve this problem, an annular piston 106 is located within an annular groove 108 in the transmission housing. Piston 106 is movable within groove 108. Annular seals 110, 112, serve to seal the piston within the groove. In order to release the brakes, a grease gun (not shown) is applied to a grease fitting 114, such as a one-way ball check valve, at one end of a passage 116 leading to the annular chamber 118 formed by piston 106 and groove 108. The pressure thus applied through passage 116 will cause piston 106 to move outwardly against face 120 so as to move the entire piston 94 outwardly to release brake 38.

When hydraulic pressure is restored, fluid pressure will again be available in passage 90. At this time relief valve 122 which may be a needle valve is opened to allow the grease in chamber 116 to flow out passage 116 to drain. Hydraulic fluid from passage 90 again fills chamber 92 to move piston 106 inwardly and piston 94 outwardly to disengage brake 38.

If desired, optional ratios can be attained by substituting different ratio gears in the low speed gear train. In this manner, either smaller turn radii and low speed or high speed operation may be accomodated.

It is to be understood that the foregoing description is merely illustrative of the preferred embodiment of the invention and that the scope of the invention is not to be limited thereto, but is to be determined by the scope of the appended claims.

What is claimed is:

1. In a transmission having a housing, input and output shafts having a plurality of planetary gear sets for providing a plurality of speeds, a parking brake for locking up said transmission including a first piston and spring means operably connected with said first piston for moving said first piston to engage said parking bake and lock up said transmission, and first means for disengaging said parking brake including first passage means for selectively communicating said first piston with a source of vehicle hydraulic pressure so that said first piston may be moved against the force of said spring means to disengage said parking brake, wherein said spring means operates to engage said parking brake when vehicle hydraulic pressure is lost, auxiliary means for disengaging said parking brake separate and distinct from said first means when said vehicle hydraulic pressure is lost comprising,

- annular auxiliary chamber means,
- a second annular piston disposed in said annular auxiliary chamber means and actuable to engage said first piston for moving said first piston against said spring means,
- a port provided in said housing,
- second passage means for communicating said port with said annular auxiliary chamber means,
- coupling means disposed in said port for connecting the passage means with an external source of hydraulic pressure separate and distinct from said vehicle,
- a check valve disposed in the passage means whereby said transmission may be disengaged when vehicle hydraulic pressure is lost by introduction of hydraulic fluid into said second passage means through said coupling means and check valve from a source of external hydraulic pressure, separate and distinct from said vehicle wherein said auxiliary means for disengaging said parking brake further comprises a selectively operable relief valve communicating with said second passage means for draining fluid from said second piston to selectively reapply said parking brake.

2. The transmission of claim 1 wherein said second piston further includes annular seals thereon for sealing with said groove.

3. The transmission of claim 1 wherein said plurality of planetary gear sets include right and left cross drives each comprising first, second and third sets for high, low, and intermediate speeds, each gear set being independently selectable by high, low, and intermediate brakes, respectively.

4. The transmission of claim 3 wherein right and left cross drives are connected by a cross shaft and wherein said first planetary set comprises a sun gear, a ring gear and a plurality of planets for transmitting power therebetween.

5. The transmission of claim 4 wherein said second planetary set comprises a ring gear and a plurality of planets, and wherein said third planetary set comprises a sun and a ring gear and a plurality of planets for transmitting power therebetween.

6. The transmission of claim 5 wherein said plurality of planets of said third planetary set are supported on a shaft integrally connected with an output flange connected to said output.

7. The transmission of claim 1 wherein said spring means comprises Belleville springs.

* * * * *

UNITED STATES PATENT OFFICE
CERTIFICATE OF CORRECTION

Patent No. 4,020,932   Dated May 3, 1977

Inventor(s) Willish E. Windish

It is certified that error appears in the above-identified patent and that said Letters Patent are hereby corrected as shown below:

Column 2, line 45, delete "p FIG. 1".

Column 2, line 46, insert --FIG. 1-- before "is".

Column 6, line 31, insert --shaft-- after "output" and before the period (.).

Signed and Sealed this

Twenty-fifth Day of April 1978

[SEAL]

Attest:

RUTH C. MASON
Attesting Officer

LUTRELLE F. PARKER
Acting Commissioner of Patents and Trademarks